United States Patent [19]
St-Pierre et al.

[11] Patent Number: 5,662,203
[45] Date of Patent: Sep. 2, 1997

[54] LUMBER TRANSFER SYSTEM

[75] Inventors: Michel St-Pierre; Daniel Bussiére, both of Normandin, Canada

[73] Assignee: Les Ateliers D'Usinage Normandin Inc., Quebec, Canada

[21] Appl. No.: 490,403

[22] Filed: Jun. 14, 1995

[51] Int. Cl.$^6$ .................................................. B65G 47/04
[52] U.S. Cl. ............................. 198/463.5; 198/459.5
[58] Field of Search .................... 198/459.5, 459.6, 198/460.1, 461.2, 463.4, 463.5, 470.1

[56] References Cited

U.S. PATENT DOCUMENTS

| | | | |
|---|---|---|---|
| 3,795,302 | 3/1974 | Schoppee | 198/463.5 |
| 3,923,142 | 12/1975 | Rysti | 198/461.2 |
| 4,077,524 | 3/1978 | Rysti | 198/459.5 |
| 4,330,055 | 5/1982 | Lunden | 198/474 |
| 4,869,360 | 9/1989 | Brown et al. | 198/460 |
| 4,945,976 | 8/1990 | Ritola | 198/459.5 |
| 5,038,915 | 8/1991 | Delsanto | 198/460.1 |
| 5,097,939 | 3/1992 | Shanklin et al. | 198/460.1 |
| 5,518,106 | 5/1996 | Allard | 198/459.5 |

*Primary Examiner*—Joseph E. Valenza
*Attorney, Agent, or Firm*—Quarles & Brady

[57] ABSTRACT

The lumber transfer system is for transferring parallel lumbers from a feeding conveyor to an outfeed conveyor and regularly spacing the lumbers thereon. The lumber transfer system comprises a loader comprising a plurality of carrying disks provided with a plurality of grasping means. Each grasping means comprises a tooth provided on an outer edge of the disk, a lumber grasping arm and a rotary actuator for rotatably mounting one end of the arm aside and parallel to the disk. The rotary actuator is rotating alternately the arm towards a closed position near the tooth and is acting as pliers therewith for grasping and holding a lumber lying at a delivering end of the feeding conveyor and towards an open position so that the lumber is not held by it. The operations of the rotary actuators are synchronized in function of the rotation speed of the disk so that each lumber arriving at the delivering end of the feeding conveyor is stopped, released to be transferred by one tooth provided on each disk and then grasped by the corresponding arms as they are rotated towards their closed position. The lumber is then transferred to the outfeed conveyor and laid on a loading end thereof as the arms are rotated towards their open position. The lumbers transferred on the outfeed conveyor are regularly spaced apart. Advantageously, the lumber transfer system according to the present invention allows the handling and transfer of different sizes and shapes of lumbers. It also allows to increase the feeding speed rate.

14 Claims, 7 Drawing Sheets

LUMBER TRANSFER SYSTEM

FIELD OF THE INVENTION

The present invention relates to a lumber transfer system and more particularly to a lumber transfer system for transferring lumbers from a feeding conveyor to an outfeed conveyor and regularly spacing the lumbers thereon.

BACKGROUND OF THE INVENTION

In sawmill or lumber mill, transportation of the lumbers requires the use of conveyors. Usually, the lumbers emerge from the mill in random order on a feeding conveyor. Certain given stages of the transformation process require that the lumbers be regularly spaced apart on a conveyor. It is therefore necessary to provide a system for transferring the lumbers from the feeding conveyor to another conveyor such that the lumbers are regularly spaced thereon. In order to be efficacious, lumber transfer systems should allow handling and transfer of any type, size and shape of lumbers such as stem, saw log, wood plank, beam and the like. Furthermore, they should allow to attain high transferring rate of lumbers. In fact, the efficiency of a lumber mill or the like depends greatly on the production rate attainable. The number of lumbers transferred per minute from one conveyor to another is a factor affecting greatly the production rate of lumber mills. Conventional lumber transfer systems do not allow to reach high speeds. Or, if they do, as for the lug loader described in U.S. Pat. No. 4,869,360, for example, they do not allow handling of different types of lumber.

SUMMARY OF THE INVENTION

The object of the present invention is to resolve the above-identified drawbacks by providing a lumber transfer system allowing the transfer of any type, size or shape of lumber at a transferring speed rate increased over prior art.

More particularly, the object of the present invention is to provide a lumber transfer system for individually transferring substantially parallel lumbers from a feeding conveyor to an outfeed conveyor and regularly spacing the lumbers thereon. The lumber transfer system comprises:

(a) a loader comprising:
   a base;
   a driving shaft operatively mounted on the base and for extending between the feeding conveyor and the outfeed conveyor;
   means for driving the shaft in rotation;
   a plurality of carrying disks coaxially mounted on the driving shaft;
   a plurality of grasping means mounted on each carrying disk and being equally distributed thereon around the shaft, each grasping means being aligned with a corresponding grasping means on each other disks and comprising:
      a tooth provided on an outer edge of the corresponding disk and substantially projecting radially therefrom;
      a lumber grasping arm; and
      rotary actuator means adjacent to the tooth for rotatably mounting one end of the arm aside and parallel to the corresponding disk, the rotary actuator means rotating alternately the arm towards a closed position where a free end of the arm is extending beyond the outer edge of the corresponding disk near the tooth and is acting as pliers therewith for grasping and holding a lumber lying at a delivering end of the feeding conveyor; and towards an open position where the free end of the arm is not extending beyond the outer edge of the corresponding disk so that the lumber is not held by it;

(b) stopping means connected to the base and actuatable for stopping a lumber arriving at the delivering end of the feeding conveyor and thereby preventing the lumber from reaching the outer edge of the disks while waiting to be transferred;

(c) firs control means for synchronizing the outfeed conveyor and the shaft; and (d) second control mans for synchronizing the operation of the rotary actuator means and stopping means in function of the rotation speed of the shaft so that each lumber arriving at the delivering end of the feeding conveyor is stopped by the stopping means, released to be transferred by one tooth provide on each disk and then grasped by the corresponding arms as they are rotated towards their closed position, the lumber being then transferred to the outfeed conveyor and laid on a loading end thereof as the arms are rotated towards their open position, the lumbers transferred on the outfeed conveyor being regularly spaced apart.

Another object of the present invention is to provide a method for individually transferring substantially parallel lumbers, stopped and accumulated side by side on a feeding conveyor, from the feeding conveyor to an outfeed conveyor and regularly spacing the lumbers thereon, the method comprising steps of:

a) releasing a lumber lying on a delivering end of the feeding conveyor;

b) grasping the lumber with a plurality of grasping means respectively provided on corresponding carrying disks coaxially mounted on a driving shaft extending between the feeding conveyor and the outfeed conveyor, each carrying disk comprising a plurality of grasping means equally distributed thereon around the driving shaft and being aligned with a corresponding grasping means on each other disks;

c) transferring the lumber over the outfeed conveyor;

d) laying the lumber on a loading end of the outfeed conveyor by opening the corresponding grasping means.

Advantageously, the lumber transfer, system according to the present invention allows the handling and transfer of different sizes and shapes of lumbers. It also allows to increase the feeding speed rate of the outfeed conveyor.

A non restrictive description of a preferred embodiment will now be given with reference to the appended drawings.

BRIEF DESCRIPTION OF THE DRAWINGS

FIG. 3 a, 3b) and 3c) are enlarged side elevational views of the lumber transfer system shown in FIG. 1 showing the sequence of a method for individually transferring parallel lumbers according to the present invention; FIGS. 3b) and 3c) are shown without the base, the stopping means and the offsetting means and show in more detail the operation of the grasping means;

NUMERAL REFERENCE OF THE ELEMENTS 2 lumbers
4 plant conveyor
10 lumber transfer system
20 feeding conveyor
22 delivering end of the feeding conveyor
24 stabilizer means
25 wheels (of stabilizer means)
30 outfeed conveyor
32 loading end
34 delivering end
40 loader
42 base
44 driving shaft
46 carrying disks
47 outer edge of the disk
48 grasping means
50 tooth
51 base of the tooth
52 lumber grasping arm
52A one end of the arm
52B free end of the arm
54 rotary actuator means
55 covers
56 hubs
58 pneumatic valves
60 stopping means, vertical pins
61 shafts
62 power cylinders
62A upper end
62B lower end
66 first control means, mechanical link
82 horizontal pin
84 pneumatic actuators
90 lug chain conveyor
92 ranks of pegs
94 loading end of the lug chain conveyor
96 third control means, mechanical link
100 intermediate disks
102 outer edge of the carrying disk
104 teeth of the carrying disk
110 sensing means
112 computer

DESCRIPTION OF A PREFERRED EMBODIMENT

Figure 1:
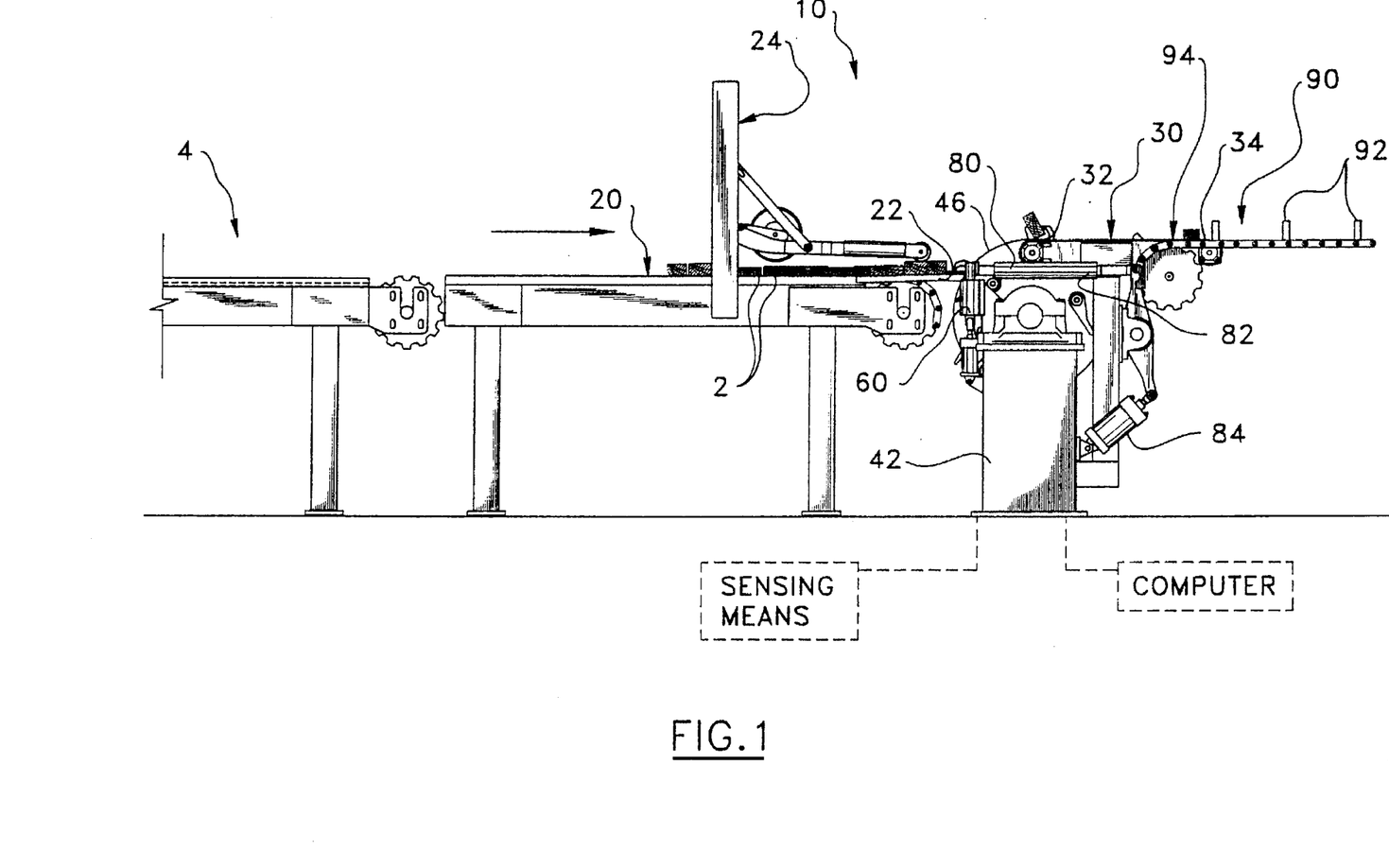
FIG. 1 is a side elevational view of a preferred embodiment of a lumber transfer system according to the present invention in combination with a lug chain conveyor.
Figure 2:
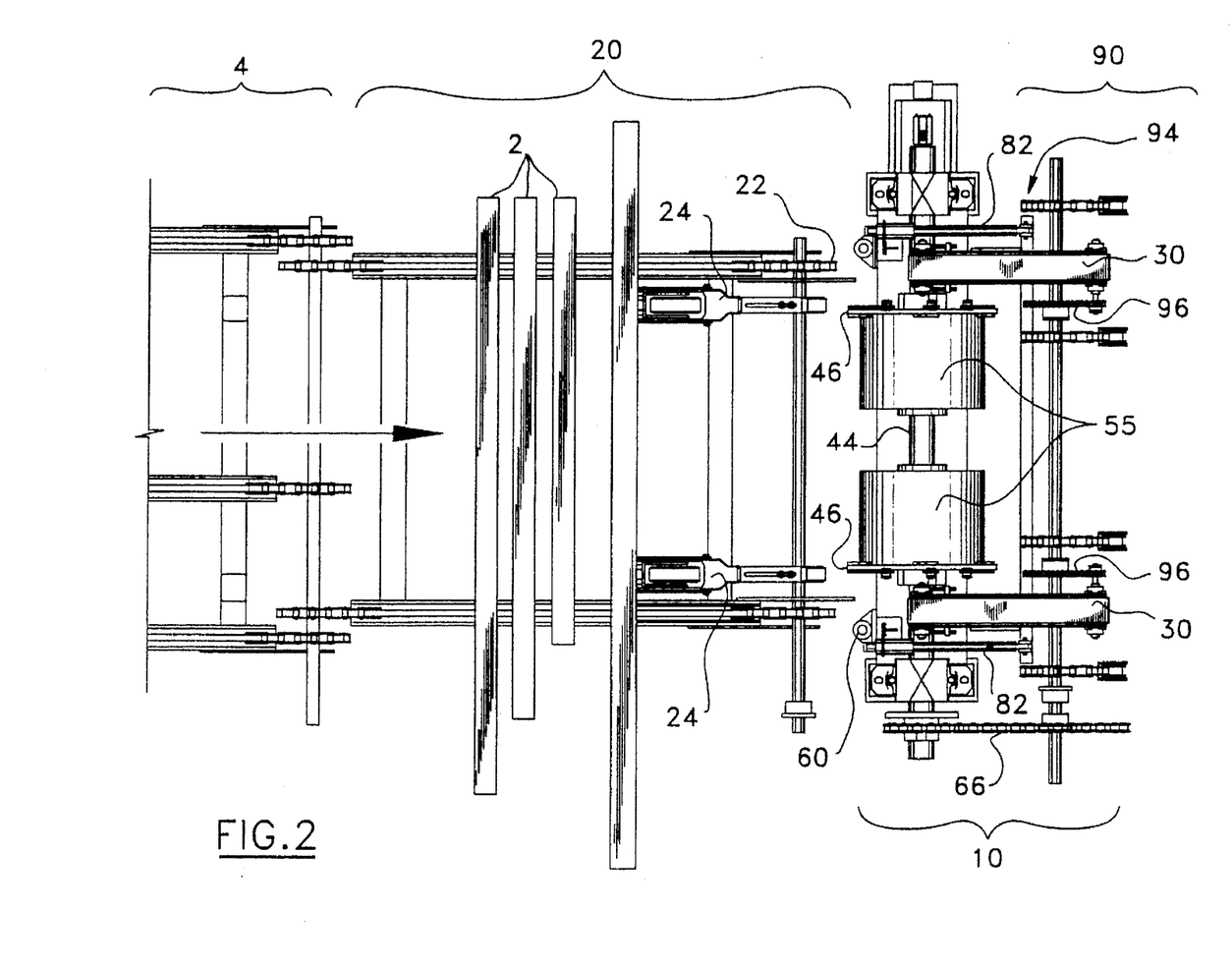
FIG. 2.is a top view of the lumber transfer system shown in FIG. 1.

Referring to FIGS. 1 and 2 there is shown a first preferred embodiment of a lumber transfer system 10 according to the present invention.

The lumber transfer system 10 is for individually transferring substantially parallel lumbers 2 from a feeding conveyor 20 to an outfeed conveyor 30, preferably a belt conveyor, and regularly spacing the lumbers 2 thereon. The lumber transfer system 10 is combined with a lug chain conveyor 90. The lug chain conveyor 90 is provided with regularly spaced ranks of pegs 92 and has a loading end 94 for receiving between each rank of pegs 92 one lumber 2 arriving at a delivering end 32 of the outfeed conveyor 30. Advantageously, the lumber transfer system 10 allows the transfer of any kind of lumber 2 of different sizes and shapes, such as stem, saw log, stud, wood plank, beam or the like.

Preferably, as illustrated in FIGS. 1 and 2, the feeding conveyor 20 is a rather small belt or chain conveyor which is receiving the lumbers 2 from a plant conveyor 4 which is part of the mill.

Mainly, the lumber transfer system 10 comprises a loader 40, stopping means 60 for stopping a lumber 2 arriving on the feeding conveyor 20 while waiting to be transferred and control means for synchronizing the system. The loader 40 will be first described, then a description of the stopping means 60 and the control means will follow.

The loader 40 comprises a driving shaft 44 operatively mounted on a base 42. The driving shaft 44 is intended to extend between the feeding conveyor 20 and the outfeed conveyor 30. Means for driving the shaft in rotation, which are rather conventional and do not need to be further described, are provided with the loader 40.

Figure 3A:
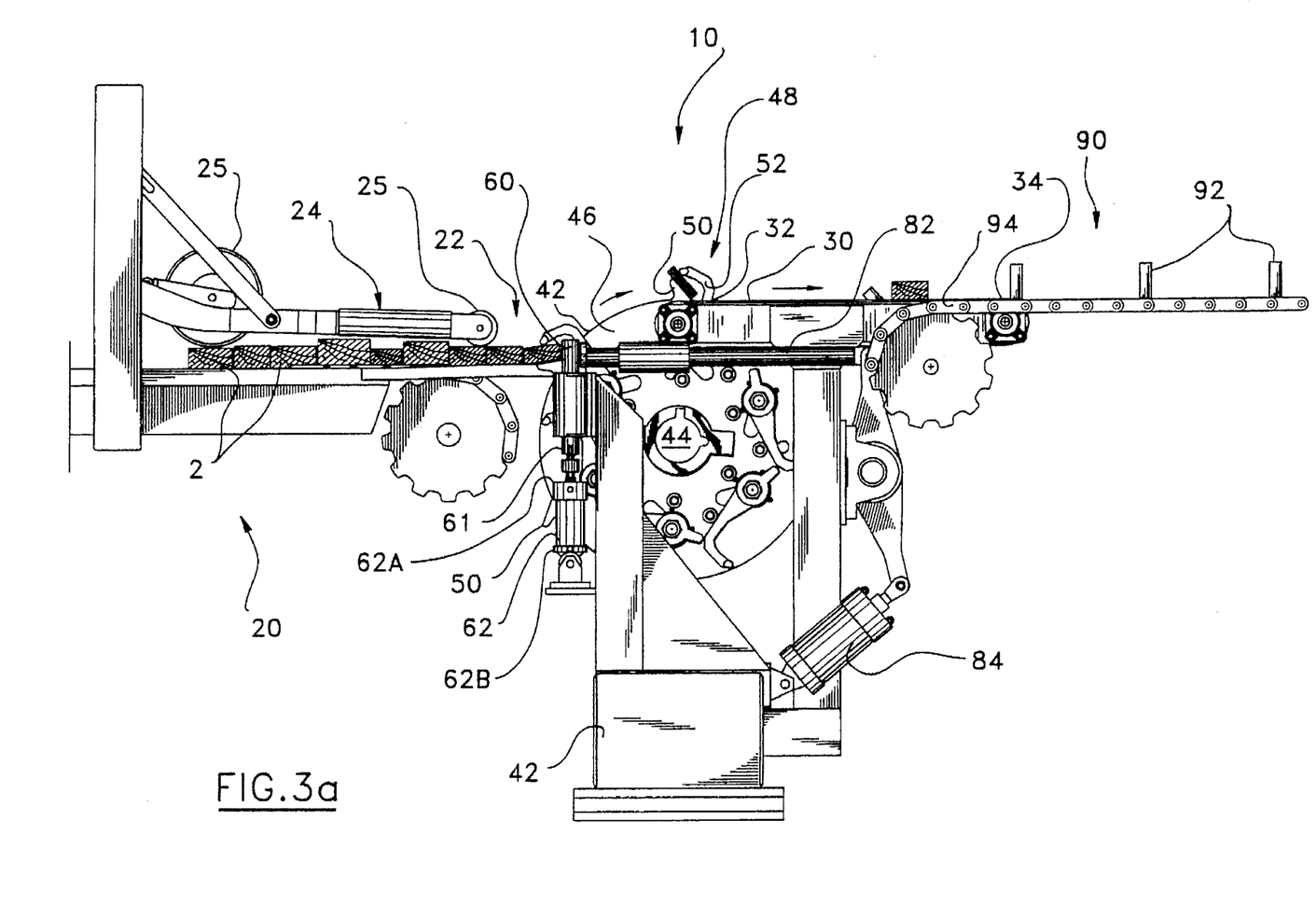

The loader 40 further comprises a plurality of carrying disks 46 coaxially mounted on the driving shaft 44, two on the preferred embodiment illustrated therein. On each carrying disk 46, a plurality of grasping means 48 are mounted and are equally distributed thereon around the shaft 44. More detailed views of the grasping means 48 are shown in FIGS. 3a), 3b), 3c) and 4. As illustrated, each grasping means 48 is aligned with a corresponding grasping means 48 on each other disks 46 and comprises a tooth 50 and a lumber grasping arm 52. The tooth 50 is provided on an outer edge 47 of the corresponding disk 46 and is substantially projecting radially therefrom. Each grasping means 48 further comprises a rotary actuator means 54 (FIG. 4) adjacent the tooth 50 for rotatably mounting one end of the arm 52 aside and parallel to the corresponding disk 46. Preferably, as shown in FIG. 2, the rotary actuator means 54 are covered with a cover 55 to prevent any damaging of the actuators while the system is operating As illustrated in FIGS. 3a) and 3b), the rotary actuator means 54 is for rotating alternately the arm 52 towards a closed position and an open position. In the closed position, a free end 52B of the arm 52 is extending beyond the outer edge 47 of the corresponding disk 46 near the tooth 50 and is acting as pliers therewith for grasping and holding a lumber 2 lying at a delivering end 22 of the feeding conveyor 20. In the open position, the free end 52B of the arm 52 is not extending beyond the outer edge 47 of the corresponding disk 46 so that the lumber 2 is not held by it (see tooth 50 marked "a" in FIG. 3b).

As illustrated in FIG. 3a), the lumber transfer system 10 further comprises stopping means 60 connected to the base 42 and actuatable for stopping a lumber 2 arriving at the delivering end 22 of the feeding conveyor 20 and thereby preventing the lumber 2 from reaching the outer edge 47 of the disks 46 while waiting to be transferred.

The transfer system 10 also comprises a first control means for synchronizing the outfeed conveyor 30 and the shaft 44 and a second control means for synchronizing the operation of the rotary actuator means 54 and stopping means 60 in function of the rotation speed of the shaft 44. The combination of the transfer system 10 with the lug chain conveyor 90 further comprises third control means for synchronizing the outfeed conveyor 30 and the lug chain conveyor 90. Preferably, the third control means, comprises a mechanical link 96 between the lug chain conveyor 90 and the outfeed conveyor 30 and the first control means in this combination comprises a mechanical link 66 between the shaft 44 and the lug chain conveyor 90. Obviously, another type of control means known in the art may be used, such as electronically controlling the rotation speed of the respective motors, if any.

Preferably, the combination further comprises a sensing means 110 for measuring the speed of the lug chain conveyor 90. Is this combination, the second control means comprises a computer 112 connected to the rotary actuator means 54 and to the sensing means. Another embodiment of the present invention (not illustrated) may comprise a sensing means for directly measuring the speed of the outfeed conveyor 90.

Figure 3B:
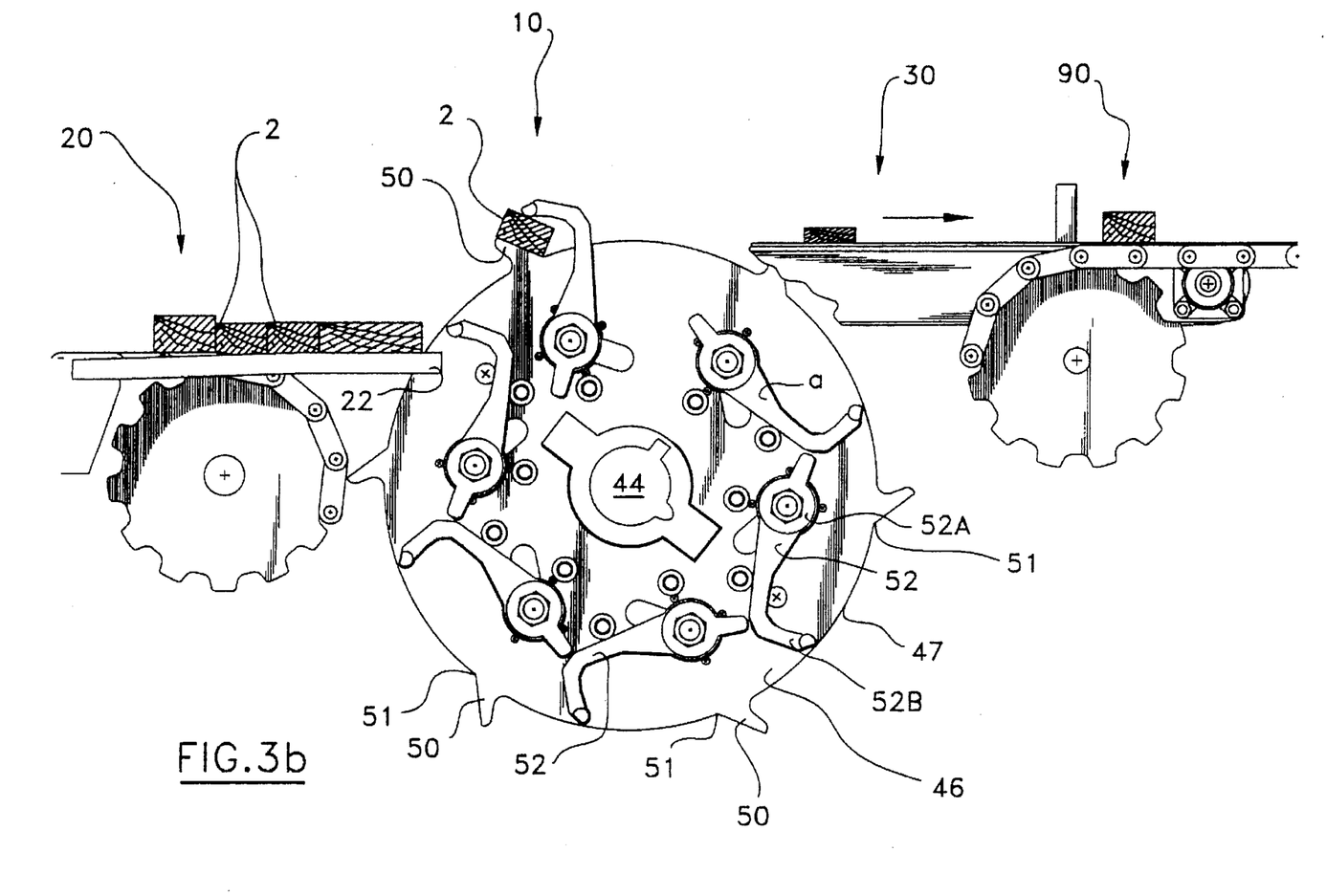
Figure 3C:
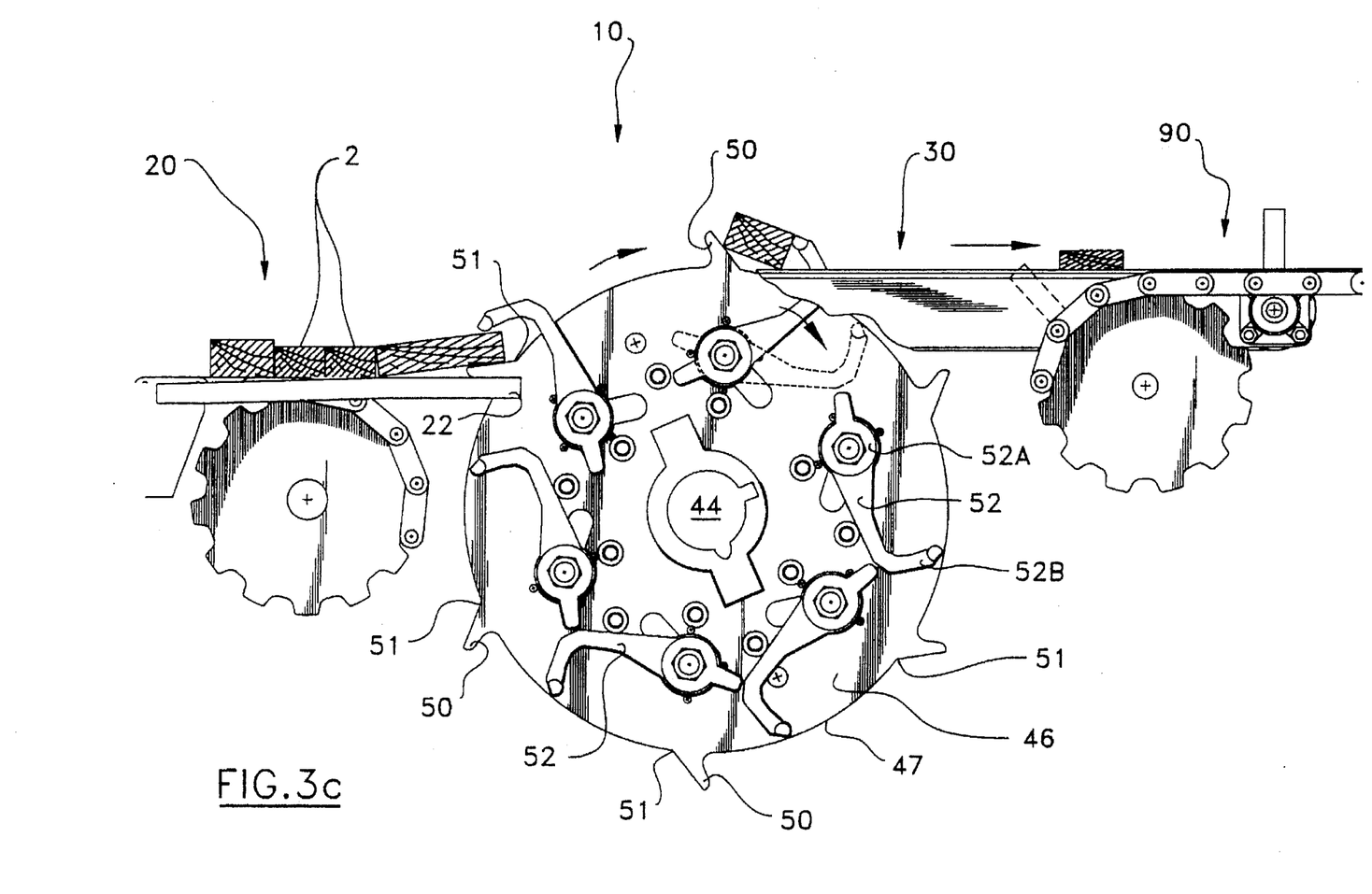

Referring now to the sequence of FIGS. 3a), 3b) and 3c), there is shown a single lumber 2 transferred with a preferred system 10 according to the present invention. The computer 112 is synchronizing the operation of the rotary actuator means 54 and stopping means 60 so that each lumber 2 arriving at the delivering end 22 of the feeding conveyor 20 is stopped by the stopping means 60, released to be transferred by one tooth 50 provided on each disk 46 and then grasped by the corresponding arms 48 as they are rotated towards their closed position. Then, the lumber 2 is transferred to the outfeed conveyor 30 and laid on the loading end 34 thereof as the arms 52 are rotated towards their open position. The lumbers 2 transferred on the outfeed conveyor 30 are regularly spaced apart.

Preferably, as illustrated in the preferred embodiment shown in FIGS. 1 to 4, each of the teeth 50 defines an angle with reference to a radial direction of the disks 46 so that each lumber 2 transferred by corresponding teeth 50 is first lifted up by bases 51 of corresponding teeth 50 and slightly rotated to lay parallel to the corresponding teeth 50 as the lumber 2 leaves the feeding conveyor 20. This slight rotation prevents friction between the lumber leaving the feeding conveyor 20 and the next lumber 2 to be grasped.

Figure 4:
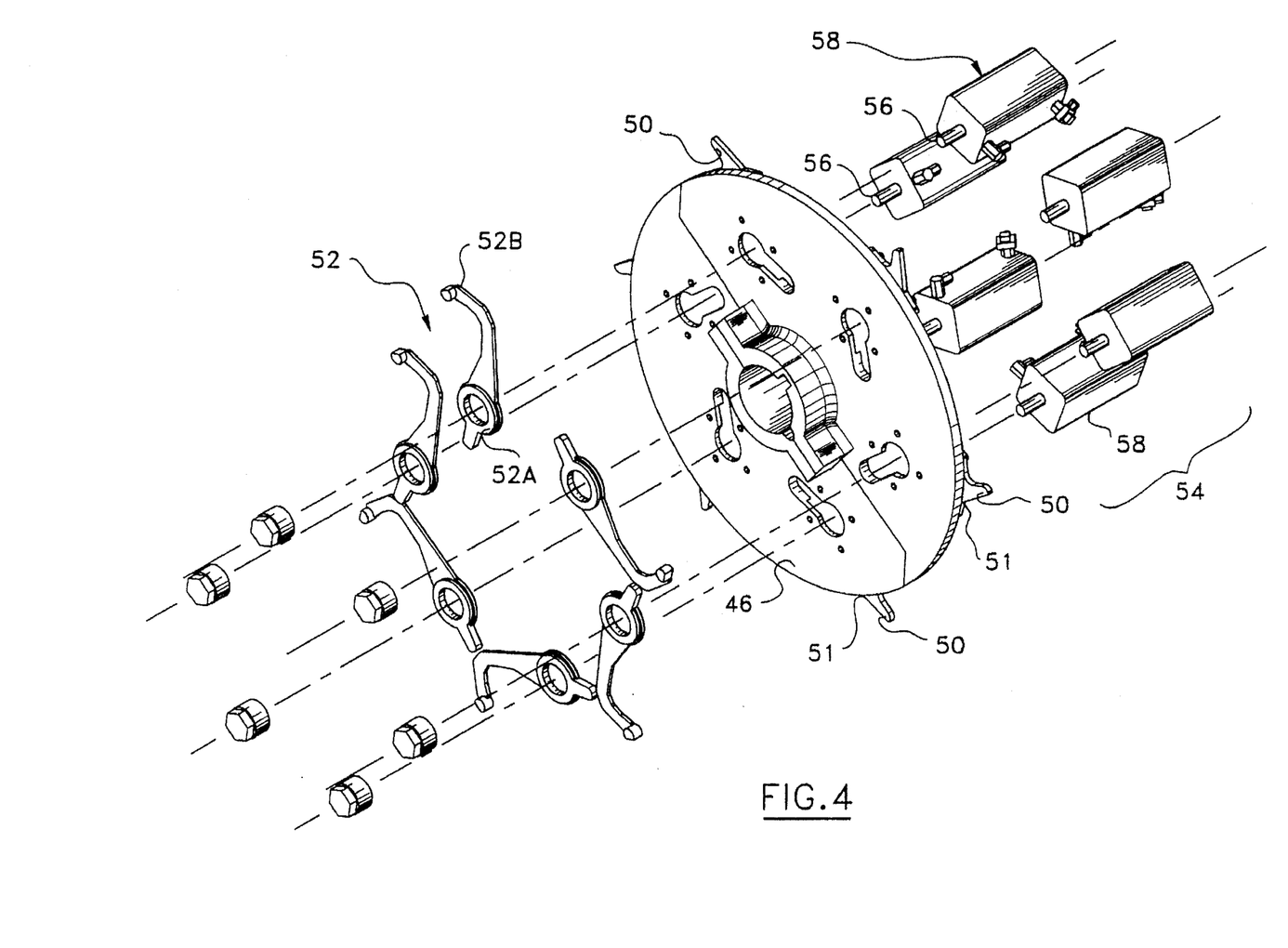
FIG. 4 is a exploded view of the carrying disk shown in FIG. 3 with the grasping means.

As illustrated in FIG. 4, the rotary actuator means 54, described hereinbefore, preferably comprises a hub 56 on which the arm 52 is mounted and a pneumatic or hydraulic valve 58 for actuating the hub 56 for driving in rotation the arm 52. The pneumatic valve 58 is controlled by the second control means. The valve 58 may be well connected to the second control means by means of electrical and pneumatic rotary joints (not illustrated) well known in the art. The pneumatic or hydraulic pressure lines are preferably bores inside the shaft 44. These elements do not need to be further described.

Preferably, as illustrated in FIG. 3a), the stopping means 60 comprises a plurality of vertical pin stops 60 individually coupled with a corresponding disk 46. Each vertical pin 60 comprises a shaft 61 and a power cylinder 62 controlled by the second control means. The power cylinder 62 has an upper end 62A operatively connected to the shaft 61 and a lower end 62B connected to the base 42.

The preferred embodiment illustrated in FIGS. 1 to 3 further comprises stabilizer means 24 mounted on the feeding conveyor 20 near its delivering end 22 for keeping the lumbers 2 flat thereon. The stabilizer means 24 comprises wheels 25 provided with a system for preventing backward movements of the lumbers 2.

The preferred embodiment of the transfer system 10 also comprises pushing means 80 connected to the base for removably offsetting a lumber 2 lying on the delivering end 22 of the feeding conveyor 20, and thereby clearing the same from the teeth 50 of the disks 46 upon any starting or stopping operation of the system. As illustrated in FIG. 3a), the pushing means may comprise horizontal pin stops 82 coupled with a corresponding disk 46. The horizontal pin stop 82 is moved by means of a pneumatic actuator 84. The actuation of the pushing means may be controlled by the second control means.

Figure 5:
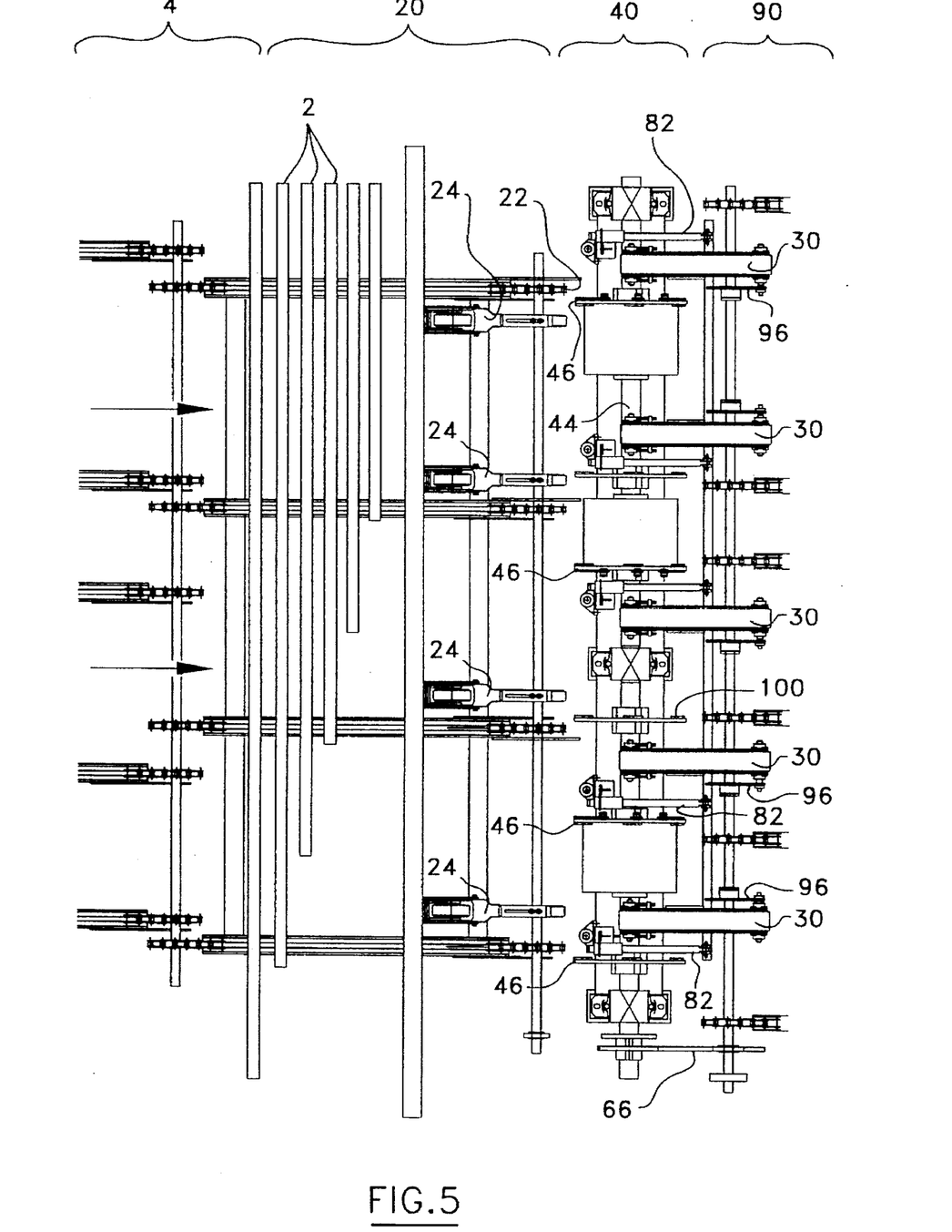
FIG. 5 is a top view of another preferred embodiment of the lumber transfer system according to the present invention used for longer lumber.

Referring to FIG. 5, there is shown a second preferred embodiment according to the present invention which is advantageously used for transferring longer lumber 2. As illustrated, the second preferred embodiment further comprises a plurality of intermediate disks 100 coaxially mounted on the driving shaft 44 between two carrying disks 46. Each intermediate disk 100 is provided on an outer edge 102 with only a plurality of teeth respectively aligned with corresponding teeth 50 on each carrying disk. The teeth of these intermediate disks 100 are for assisting the carrying disks 46 in transferring any lumber.

Referring to FIGS. 3a), 3b) and 3c), the sequence of a method according to the present invention is illustrated. The method is for individually transferring substantially parallel lumbers 2, stopped and accumulated side by side on a feeding conveyor 20, from the feeding conveyor 20 to an outfeed conveyor 30 and regularly spacing the lumbers 2 thereon. The method comprises steps of releasing a lumber 2 lying on a delivering end 22 of the feeding conveyor 20. The lumber 2 is then grasped with a plurality of grasping means 48 respectively provided on corresponding carrying disks 46 coaxially mounted on a driving shaft 44 extending between the feeding conveyor 20 and the outfeed conveyor 30. Each carrying disk 46 comprises a plurality of grasping means 48 equally distributed thereon around the driving shaft 44 and is aligned with a corresponding grasping means 48 on each other disks 46. Then, the lumber 2 is transferred over the outfeed conveyor 30 and laid on a loading end 34 of the outfeed conveyor 30 by opening the corresponding grasping means 48.

Preferably, the method further comprises, before the lumber 2 is released, a step of stabilizing the lumbers flat on the feeding conveyor 20.

Preferably also, the method further comprises a step of offsetting a lumber 2 lying on the delivering end 22 of the feeding conveyor 20 for clearing the lumber 2 from the grasping means 48 upon any starting or stopping of the driving shaft 44.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A lumber transfer system for individually transferring substantially parallel lumbers from a feeding conveyor to an outfeed conveyor and regularly spacing the lumbers thereon, the lumber transfer system comprising:

(a) a loader comprising:
a base;
a driving shaft operatively mounted on the base and for extending between the feeding conveyor and the outfeed conveyor;
means for driving the shaft in rotation;
a plurality of carrying disks coaxially mounted on the driving shaft;
a plurality of gasping means mounted on each carrying disk and being equally distributed thereon around the shaft, each grasping means being aligned with a corresponding grasping means on each other disks and comprising:
a tooth provided on an outer edge of the corresponding disk and substantially projecting radially therefrom;
a lumber grasping arm; and rotary actuator means adjacent to the tooth for rotatably mounting one end of the arm aside and parallel to the corresponding disk, the rotary actuator means rotating alternately the arm towards a closed position where a free end of the arm is extending beyond the outer edge of the corresponding disk near the tooth and is acting as pliers therewith for grasping and holding a lumber lying at a delivering end of the feeding conveyor; and towards an open position where the free end of the arm is not extending beyond the outer edge of the corresponding disk so that the lumber is not held by it, each of the teeth defining an angle with reference to a dial direction of the disks so that each lumber transferred by corresponding teeth is first lifted up by bases of said corresponding teeth and slightly rotated to lay parallel to the corresponding teeth as the lumber leaves the feeding conveyor;

b) stopping means connected to the base and actuatable for stopping a lumber arriving at the delivering end of the feeding conveyor and thereby preventing the lumber from reaching the outer edge of the disks while waiting to be transferred;

(c) first control means for synchronizing the outfeed conveyor and the shaft; and (d) second control means for synchronizing an operation of the rotary actuator means and stopping means in function of the rotation speed of the shaft so that each lumber arriving at the delivering end of the feeding conveyor is stopped by the stopping means, released to be transferred by one tooth provided on each disk and then grasped by the corresponding arms as they are rotated towards their closed position, the lumber being then transferred to the outfeed conveyor and laid on a loading end thereof as the arms are rotated towards their open position, the lumbers transferred on the outfeed conveyor being regularly spaced apart.

2. A lumber transfer system as claimed in claim 1, further comprising pushing means connected to the base for removably offsetting a lumber lying on the delivering end of the feeding conveyor, thereby clearing the same from the teeth of the disks upon any starting or stopping operation of the system.

3. A lumber transfer system as claimed in claim 2, wherein the outfeed conveyor comprises a belt conveyor.

4. A combination of a lumber transfer system as claimed in claim 3 with a lug chain conveyor provided with regularly spaced ranks of pegs and having a loading end for receiving between each rank of pegs one lumber arriving at a delivering end of the outfeed conveyor, the combination further comprising third control means for synchronizing the outfeed conveyor and the lug chain conveyor.

5. A combination as claimed in claim 4, wherein the third control means comprises a mechanical link between the lug chain conveyor and the outfeed conveyor.

6. A combination as claimed in claim 5, wherein the first control means comprises a mechanical link between the shaft and the lug chain conveyor.

7. A combination as claimed in claim 6, further comprising stabilizer means mounted on the feedingconveyor near its delivering end for keeping the lumbers flat thereon.

8. A combination as claimed in claim 7 further comprising a plurality of intermediate disks coaxially mounted on the driving shaft between two carrying disks, each intermediate disk being provided on an outer edge with only a plurality of teeth respectively aligned with corresponding teeth on each carrying disk and being for assisting the carrying disks in transferring any lumber.

9. A combination as claimed in claim 8, wherein the rotary actuator means comprises:

a hub on which the arm is mounted; and a pneumatic valve for actuating the hub for driving in rotation the peg and being controlled by the second control means.

10. A combination as claimed in claim 9, further comprising a sensing means for measuring the speed of the lug chain conveyor and wherein the second control means comprises a computer connected to the rotary actuator means and to the sensing means.

11. A combination as claimed in claim 10, wherein the topping means comprises a plurality of vertical pin tops individually coupled with a corresponding disk, each vertical pin comprising:

a shaft; and a power cylinder controlled by the second control means and having an upper end operatively connected to the shaft and a lower end operatively connected to the base.

12. A method for individually transferring substantially parallel lumbers, stopped and accumulated side by side on a feeding conveyor, from the feeding conveyor to an outfeed conveyor and regularly spacing the lumbers thereon, the method comprising steps of:

a) releasing a lumber lying on a delivering end of the feeding conveyor;

b) grasping the lumber with a plurality of grasping means respectively provided on corresponding carrying disks coaxially mounted on a driving shaft extending between the feeding conveyor and the outfeed conveyor, each carrying disk comprising a plurality of grasping means equally distributed thereon around the driving shaft and being aligned with a corresponding grasping means on each other disks, each grasping means comprising:

a tooth provided on an outer edge of the corresponding disk and substantially projecting radially therefrom;

a lumber grasping arm; and rotary actuator means adjacent to the tooth for rotatably mounting one end of the arm aside and parallel to the corresponding disk, the rotary actuator means rotating alternately the arm towards a closed position where a free end of the arm is extending beyond the outer edge of the corresponding disk near the tooth and is acting as pliers therewith for grasping and holding a lumber lying at a delivering end of the feeding conveyor; and towards an open position where the free end of the arm is not extending beyond the outer edge of the corresponding disk so that the lumber is not held by it, each of the teeth defining an angle with reference to a radial direction of the disks so that each lumber transferred by corresponding teeth is first lifted up by bases of said corresponding teeth and slightly rotated to lay parallel to the corresponding teeth as the lumber leaves the feeding conveyor;

c) transferring the lumber over the outfeed conveyor;

d) laying the lumber on a loading end of the outfeed conveyor by opening the corresponding grasping means.

13. A method as claimed in claim 12, further comprising, before step a), a step of stabilizing the lumbers flat on the feeding conveyor.

14. A method as claimed in claim 13, further comprising a step of offsetting a lumber lying on the delivering end of the feeding conveyor for clearing the lumber from the grasping means upon any starting or stopping of the driving shaft.

* * * * *